Oct. 24, 1967          J. C. LITTMANN          3,348,638
POWER ACTUATED PARKING BRAKE
Filed Aug. 2, 1965          2 Sheets-Sheet 1
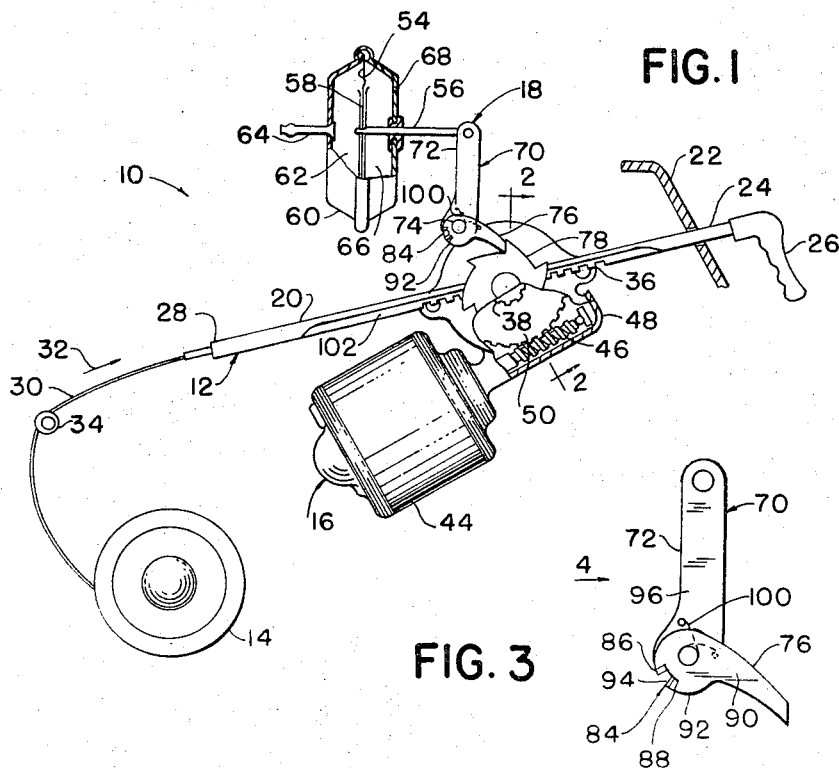
FIG. 1
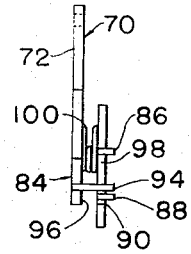
FIG. 3
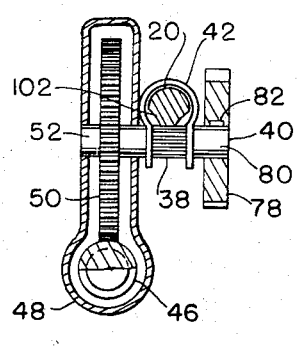
FIG. 2
FIG. 4
INVENTOR.
JOSEPH C. LITTMANN
BY Whittemore,
Hulbert & Belknap
ATTORNEYS Oct. 24, 1967       J. C. LITTMANN       3,348,638
POWER ACTUATED PARKING BRAKE
Filed Aug. 2, 1965                 2 Sheets-Sheet 2

INVENTOR
JOSEPH C. LITTMANN
BY Whittemore,
Hulbert & Belknap
ATTORNEYS

United States Patent Office 3,348,638
Patented Oct. 24, 1967

3,348,638
POWER ACTUATED PARKING BRAKE
Joseph C. Littmann, Grosse Pointe Woods, Mich., assignor to Ferro Manufacturing Corporation, Detroit, Mich., a corporation of Michigan
Filed Aug. 2, 1965, Ser. No. 476,302
8 Claims. (Cl. 188—162)

ABSTRACT OF THE DISCLOSURE

Parking brake structure including power actuating structure for driving a brake setting rod in one direction, power release structure including vacuum actuated pawl mechanism and mechanical release structure including longitudinally extending recesses in the rod for receiving a pinion during brake release on rotation of the actuating shaft which pinion is engaged with a rack portion on the rod during brake setting. Provision is also made for power actuation of the parking brake structure with a predetermined torque through the use of an electrical actuating circuit and a torque responsive switch.

---

The invention relates to brakes and refers more specifically to a power actuated parking brake for an automobile or the like.

Automobiles today are generally equipped with a parking brake. The parking brake is usually set on parking of the automobile, particularly if the automobile is parked on an incline and is released before subsequent driving of the automobile.

Prior parking brakes have almost universally been manually set and manually released. With many parking brakes the manual setting and release thereof has required considerable strength which is undesirable. Also, there is a tendency to forget about the parking brake being set on entering an automobile so that automobiles have sometimes been driven considerable distances with the parking brake set which is detrimental to the brake system.

It is therefore an object of the invention to provide improved parking brake structure.

Another object of the invention is to provide a power actuated parking brake.

Another object is to provide parking brake actuating structure for power setting and power release of a parking brake.

Another object is to provide a power actuated parking brake wherein setting of the brake is accomplished through electro-mechanical apparatus.

Another object is to provide a power actuated parking brake wherein the setting of the brake is controlled by a torque responsive switch operable to insure uniform setting of the brake.

Another object is to provide a power actuated parking brake wherein brake release is accomplished through engine vacuum actuated brake release mechanism.

Another object is to provide a power actuated parking brake as set forth above including structure for manually releasing the brake.

Another object is to provide an improved torque actuated switch for use in setting power actuated brakes and the like.

Another object is to provide a power actuated parking brake which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a diagrammatic view of a parking brake constructed in accordance with the invention.

FIGURE 2 is an enlarged section view of a portion of the parking brake illustrated in FIGURE 1 and taken substantially on the line 2—2 in FIGURE 1.

FIGURE 3 is an enlarged elevation view of a portion of the brake release mechanism of the parking brake illustrated in FIGURE 1.

FIGURE 4 is a side view of the portion of the brake release mechanism illustrated in FIGURE 3 taken in the direction of arrow 4 in FIGURE 3.

Figure 5:
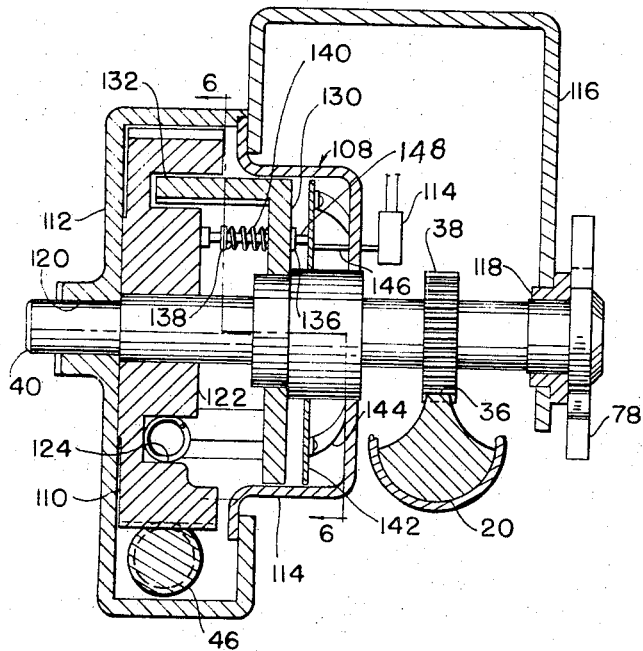
FIGURE 5 is an enlarged section view of a portion of a modified parking brake similar to that shown in FIGURES 1–4 taken substantially on the line 5—5 in FIGURE 6.

With particular reference to the figures of the drawing, one embodiment of the present invention will now be disclosed in detail.

As shown best in FIGURE 1, the power actuated parking brake 10 includes the structure 12 movable longitudinally to actuate the brake 14, electro-mechanical apparatus 16 for moving the brake actuating structure 12 to set the brake 14 and the engine vacuum actuated mechanism 18 for power release of the brake actuating structure 12 to release the brake 14.

The brake actuating structure 12 is constructed and arranged to permit manual release of the brake 14, if required.

More specifically the brake actuating structure 12 of the power actuated parking brake 10 includes the axially movable rod 20 extending through the dashboard 22 of a vehicle at end 24 and having thereon the manual actuating handle 26. The other end 28 of rod 20 is connected to a brake setting cable 30 which on movement in the direction of arrow 32 about pulley 34 will cause the brake 14 to be set. Rod 20 further includes the rack teeth 36 therein held in engagement with the pinion portion 38 of shaft 40 by means of bracket 42 best shown in FIGURE 2, the ends of which are positioned over the shaft 40.

The electro-mechanical brake setting apparatus 16 includes the uni-directional electric motor 44 positioned to drive the worm 46 rotatably mounted in the housing 48 in engagement with the worm gear 50. The worm gear 50 is secured to end 52 of shaft 40 for rotation therewith by convenient means, such as a key (not shown).

The vacuum actuated brake release mechanism 18 includes the vacuum actuating diaphragm 54 to which the connecting rod 56 is secured by means of plates 58 secured between the two parts of the diaphragm housing 60. The chamber 62 formed within the diaphragm housing 60 is connected by convenient means, such as conduit 64 to engine manifold vacuum, while the chamber 66 is open to atmosphere through the port 68.

The pawl structure 70 of the vacuum actuated brake release mechanism 18 includes the lever member 72 pivotally connected to the connecting rod 56 for pivotal movement about the fixed pivot 74. The pawl member 76 is also pivotally mounted on the fixed pivot 74 and operably engages the ratchet wheel 78 secured to the end 80 of the shaft 40 by convenient means, such as key 82.

A lost motion connection 84 is provided between the lever member 72 and pawl member 76, as shown best in FIGURES 3 and 4. The lost motion connection includes the tabs 86 and 88 extending from the side 90 of the pawl member 76 at the periphery of the heel portion 92 thereof. A longer tab 94 extends from the side 96 of the lever member 72 into the space 98 between the tabs 86 and 88 for movement therebetween. Spring 100 is provided acting between the lever member 72 and pawl member 92 to urge the pawl member 92 in a clockwise direction, as shown in FIGURE 1, so that the tab 94 is normally in engagement with the tab 88.

In over-all operation of the parking brake structure 10, when it is desired to set the brake 14, the electric motor 44 is energized to rotate the worm 46, worm gear 50 and shaft 40 in a direction to move the rod 20 engaged with the pinion portion 38 of the shaft 40 in the direction of arrow 32. During this movement of the rod 20 to set the brake 14, the ratchet wheel 78 is rotated and the pawl member 76 cams over the ratchet teeth while moving within the limits of movement of the lost motion connection 84 between the lever member 70 and pawl member 76. The pawl member 76 during this time is urged by spring 100 into engagement with the ratchet wheel 78.

On stopping of the motor 44 the rod 20 in engagement with the pinion 38 is thus prevented from moving to the left in FIGURE 1 to release the brake 14 due to the engagement of the pawl member 76 with the ratchet wheel 78 which in turn is keyed to the shaft 40.

When the engine (not shown) of the vehicle in which the parking brake 10 is mounted is subsequently started and the shifting mechanism of the vehicle is placed in a drive position vacuum will be drawn in chamber 62 through conduit 64 connected to an engine vacuum source through a valve on the vehicle shifting mechanism (not shown), to move the connecting rod 56 to the left in FIGURE 1, thus rotating the lever member 72 in a counterclockwise direction with the tabs 88 and 94 of the lost motion connection 84 in engagement to move the pawl member 76 out of engagement with the ratchet wheel 78. The pressure of the set brake 14 on cable 30 will cause rod 20 to move to the left and the brake 14 will be released. This requires of course the use of a worm 46 and worm gear 50 which may be driven in reverse by applying a rotational force to shaft 40 and worm gear 50. Such worm and worm gear combinations are readily obtained commercially.

Should the brake release mechanism fail to operate as will be evidenced by the extension of end 24 of the rod 20 through the dashboard 22, the handle 26 may be gripped and turned to permit the recesses 102 provided in the sides of the road 20 to move into position over the pinion portion 38 of shaft 40. The rod 20 will then be drawn to the left in FIGURE 1 by the force on the cable 30 to release the brake 14. The handle 26 may then be returned to the vertical position to reengage the rack teeth 36 on rod 20 and the pinion portion 38 of shaft 40. Thus manual release of the power actuated parking brake 10 is provided for.

Figure 7:
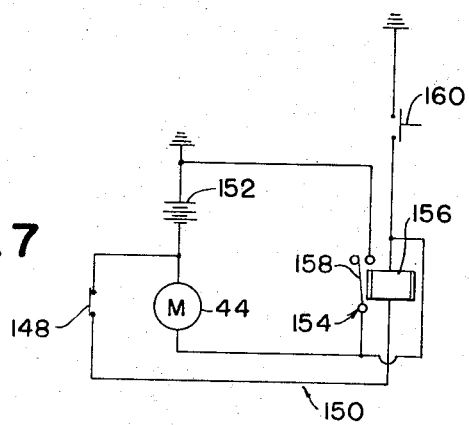
FIGURE 7 is a schematic diagram of a control circuit for the modified parking brake illustrated in FIGURES 5 and 6.
Figure 6:
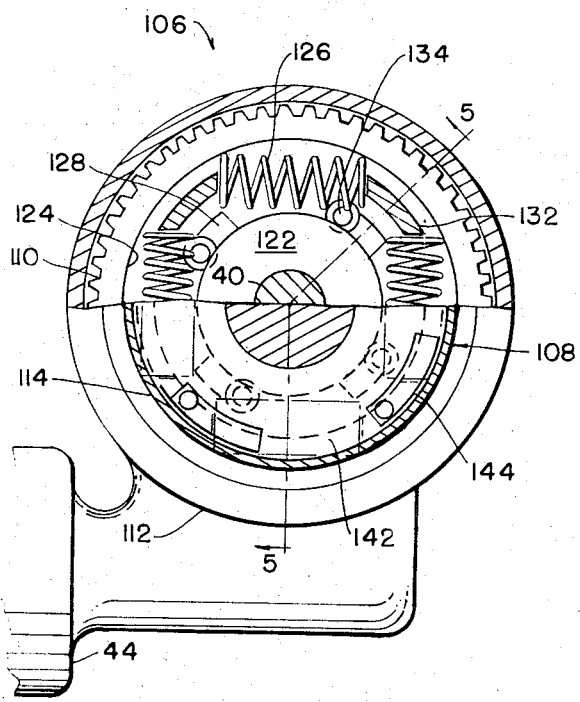
FIGURE 6 is a section view of the portion of the modified parking brake illustrated in FIGURE 5 taken substantially on the line 6—6 in FIGURE 5.

The modified parking brake structure 106 illustrated in FIGURES 5–7 includes torque actuated switching structure 108 for deenergizing the brake actuating motor 44 during brake setting to insure the uniform and full setting of the brake 14 at all times.

The parking brake structure 106 is similar to the parking brake structure 10 except as shown in FIGURES 5–7 and includes the ratchet wheel 78, shaft 40 having pinion portion 38 thereon engageable with the rack teeth 36 on rod 20 as before. Again the motor 44 drives the worm 46 in one direction to impart rotation to the modified worm gear 110.

In accordance with the modified brake structure 106 a housing 112 is provided for the worm gear 110, a cover 114 is provided on the housing 112 and a bracket 116 is secured to the cover 114 for supporting the bushing 118. The shaft 40 is rotatably mounted in the opening 120 in the housing 112 and the bushing 118, as shown in FIGURE 5.

The worm gear 110 is mounted on shaft 40 for rotation with respect thereto and is provided with a recessed inner side 122. An annular recess 124 is provided in the recessed side 122 of the worm gear 110 in which four evenly spaced apart helical springs 126, illustrated best in FIGURE 6, are fixed in position. Four camming ramps 128 are provided on the surface 122 of the gear 110 between the springs 126 and radially inwardly thereof, as shown best in FIGURE 6.

A torque plate 130 is connected to the shaft for rotation with the shaft 40 in contrast to the worm gear 110 which rotates on the shaft 40. The plate 130 is provided with four angularly spaced apart equally separated fingers 132 which extend into the annular recess 124 in the worm gear 110 between and in engagement with the springs 126 therein. The springs 126 may be prestressed.

A cam pin 134 having the radially extending portions 136 and 138 extends through the torque plate 130 and is spring biased into contact with one of the ramps 128 by spring means 140 at four positions around the torque plate 130 in alignment with the ramps 128 on the worm gear 110, as shown best in FIGURES 5 and 6.

The spider plate 142 is positioned over the shaft 40 for axial movement therealong and is biased toward the torque plate 130 and into engagement with the cam pins 134 by means of the resilient fingers 144 in engagement with the housing cover 114. A dowel 146 is secured to the spider plate 142 for movement axially of the shaft 40 to close the switch 148 on movement of the spider plate 142 to the right in FIGURE 5 on the shaft 40.

The operation of the torque actuated switching structure 108 on setting of the modified parking brake structure 106 will be considered in conjunction with the schematic diagram illustrated in FIGURE 7 of a control circuit for the modified parking brake structure 106. The switch 148 and the parking brake actuating motor 44 are included in the schematic diagram 150. A source of electric energy 152 which may be the automobile battery, a two position relay 154 having coil 156 and contacts 158, and a dashboard mounted push button 160 are also included in the schematic diagram of FIGURE 7.

In operating, the push button 160 is pressed to energize relay coil 156 and move the contacts 158 from the open position to a closed position whereby the motor 44 is connected to ground and is energized by the battery 152. The push button 160 may then be released with the coil 156 being energized through the battery 152, torque actuated switch 148 and closed relay contacts 158. The worm 46 is thus driven in a direction to drive the shaft 40 through worm gear 110 and torque plate 130 to move the rod 20 in a brake setting direction.

When the brake 14 has been set the rod 20 will provide a sufficient resistance to rotation of the shaft 40 through the rack and pinion connection therebetween to overcome the resistance to relative rotation between the torque plate 130 and worm gear 110 offered by the springs 126. The springs 126 will then compress allowing relative rotation between the torque plate 130 and worm gear 110 whereupon the cam pins 134 will be cammed to the right in FIGURE 5 on camming ramps 128 in opposition to the bias applied thereto by the springs 140.

The spider plate 142 will thus be moved to the right in FIGURE 5 by the pins 134 so that the switch 148 will be opened by the dowel 146. Opening the switch 148 will deenergize the relay coil 156 causing the contacts 158 of the relay 154 to open, deenergizing the motor 44. The shaft will now be rotated into a position in which the brake 14 is uniformly and fully set. Release of the brake structure 106 is accomplished as before.

While one embodiment of the present invention and a modification thereof have been considered in detail, it is understood that other embodiments and modifications are contemplated. It is the intention to include all embodiments and modifications of the invention as are defined by the appended claims within the scope of the invention.

What I claim as my invention is:

1. A power actuated parking brake including a rod movable axially, a cable connected to said rod and to a brake operable to set said brake when said rod is moved in one direction and to release said brake when said rod is moved in the other direction, a shaft extending transversely of the rod and having a pinion portion thereon, said rod having a rack portion thereon engaged with the pinion portion of said shaft, electro-mechanical brake setting apparatus connected directly to one end of the shaft to turn the shaft in one direction to set the brake and engine-vacuum actuated mechanism connected to the other end of the shaft for retaining the rod in a position to maintain the brake set and for releasing the brake when vacuum is applied thereto.

2. Structure as set forth in claim 1 wherein the electro-mechanical brake setting apparatus comprises a uni-directional electric motor, a worm secured to the electric motor for rotation thereby and a worm gear engaged by said worm for rotation thereby connected directly to the one end of said shaft.

3. Structure as set forth in claim 1 wherein the vacuum actuated brake release mechanism includes a diaphragm, a housing forming a vacuum chamber on one side of said diaphragm connected to engine manifold vacuum, a connecting rod secured to the diaphragm for movement therewith at one end, a ratchet wheel secured to the other end of said shaft, pawl means engaged with the ratchet wheel and pivotally connected to said connecting rod for movement therewith into and out of engagement with said ratchet wheel.

4. Structure as set forth in claim 3 wherein said pawl means includes a lever member and a pawl member with a lost motion connection therebetween and spring means urging said pawl member away from said lever member and into engagement with said ratchet wheel.

5. A power actuated parking brake including a rod movable axially, a cable connected to said rod and to a brake operable to set said brake when said rod is moved in one direction and to release said brake when said rod is moved in the other direction, a shaft extending transversely of the rod and having a pinion portion thereon, said rod having a rack portion thereon engaged with the pinion portion of said shaft, electro-mechanical brake setting apparatus connected directly to one end of the shaft to turn the shaft in one direction to set the brake, engine-vacuum actuated mechanism connected to the other end of the shaft for retaining the rod in a position to maintain the brake set and for releasing the brake when vacuum is applied thereto and manual brake release structure operably associated with said brake actuating structure to permit manual release of the brake.

6. Structure as set forth in claim 5 wherein the manual brake release structure comprises a handle secured to one end of the rod and longitudinally extending recesses in the rod on both sides of the rack portion thereof whereby the pinion portion of the shaft is cleared by the rod on rotation of the rod in either direction from the position in which the rack portion of the rod engages the pinion portion of the shaft.

7. A power actuated parking brake including an axially movable rod having a rack portion extending longitudinally thereof, a cable connected to said rod and to a brake operable to set said brake when said rod is moved in one direction and to release the brake when said rod is moved in the other direction, a unitary shaft extending transversely of the rod having a pinion portion thereon engaged with the rack portion of the rod, a worm gear secured to the rod for rotation therewith, a worm engaged with said worm gear, motor means secured to said worm for rotation thereof to drive the rod in a brake setting direction, a vacuum actuated diaphragm, a piston rod secured to the vacuum actuated diaphragm for movement therewith and bell crank pawl means having a pawl on one end and having the other end connected to the piston rod centrally pivotally mounted, ratchet means secured to the shaft for rotation therewith and engageable with said pawl for preventing rotation of said shaft in a direction to move said rod to release said brake and a longitudinally extending recess on said rod adjacent said rack portion for receiving said pinion portion of said shaft on rotation of said rod to permit axial movement of said rod in a direction to release said brake.

8. Structure as set forth in claim 7 wherein the ends of the bell crank lever are separately rotatable about the pivot mounting of the bell crank lever, lost motion structure is provided between the ends of the bell crank lever for limiting the relative rotation thereof, and resilient means are provided urging the ends of the bell crank lever into a predetermined position wherein the pawl is permitted movement with respect to the other end of the bell crank lever in opposition to said resilient means on rotation of said ratchet means a predetermined amount within the lost motion allowed between the ends of the bell crank and movement of the other end of the bell crank will substantially immediately produce movement of the one end out of engagement with the ratchet.

References Cited

UNITED STATES PATENTS

| | | | |
|---|---|---|---|
| 1,462,918 | 7/1923 | Norton | 188—162 |
| 2,251,521 | 8/1941 | McIntyre et al. | 188—162 |
| 2,835,353 | 5/1958 | Brundage | 188—162 X |
| 2,867,310 | 1/1959 | Martin | 192—4 |
| 3,000,476 | 9/1961 | Barry | 188—162 X |
| 3,270,840 | 9/1966 | De Claire | 188—106 X |

DUANE A. REGER, *Primary Examiner.*